United States Patent [19]
Beck, Jr.

[11] Patent Number: 6,050,355
[45] Date of Patent: Apr. 18, 2000

[54] MODULAR CRAWLER SYSTEM

[76] Inventor: Roland R. Beck, Jr., W5593 Hwy. 49, Waupun, Wis. 53936

[21] Appl. No.: 08/907,379

[22] Filed: Aug. 7, 1997

[51] Int. Cl.[7] .................................................... B62D 55/12
[52] U.S. Cl. ........................ 180/9.62; 180/9.46; 305/126; 305/130
[58] Field of Search ............................... 180/9, 9.1, 9.62, 180/7.1, 9.42, 9.44, 9.46; 305/124–130, 137, 142, 185, 51, 195, 196, 200–204, 59

[56] References Cited

U.S. PATENT DOCUMENTS

| | | |
|---|---|---|
| 2,218,258 | 10/1940 | Ekbom . |
| 2,373,316 | 4/1945 | Landy . |
| 3,093,423 | 6/1963 | Adams . |
| 4,579,182 | 4/1986 | Dewing .................................. 180/9.46 |

*Primary Examiner*—Christopher P. Schwartz
*Assistant Examiner*—C. T. Bartz
*Attorney, Agent, or Firm*—Donald Cayen

[57] ABSTRACT

A modular crawler system for moving heavy objects comprises multiple crawlers that can be controlled independently of each other. Each crawler has a pair of tracks that are controllable independently of each other to enable the crawler to travel in straight lines as well as to turn the crawler. The crawlers are very compact and have low profiles. Each crawler has a carrier on which the object is placed. Locking means selectively engage and disengage the carrier. When the locking means is engaged with the carrier, the carrier cannot rotate within the crawler, thereby enabling multiple crawlers to move the object in a straight line. When the locking means is disengaged, the carrier can rotate relative to the object and thereby enable the crawler to turn under the object. The crawlers can then move the object in a different direction without changing the orientation of the object.

13 Claims, 8 Drawing Sheets

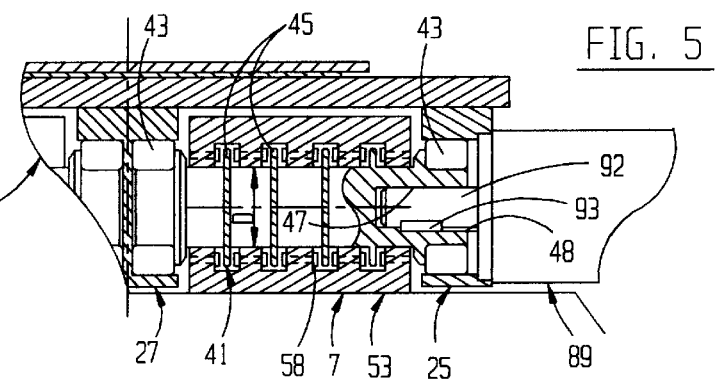
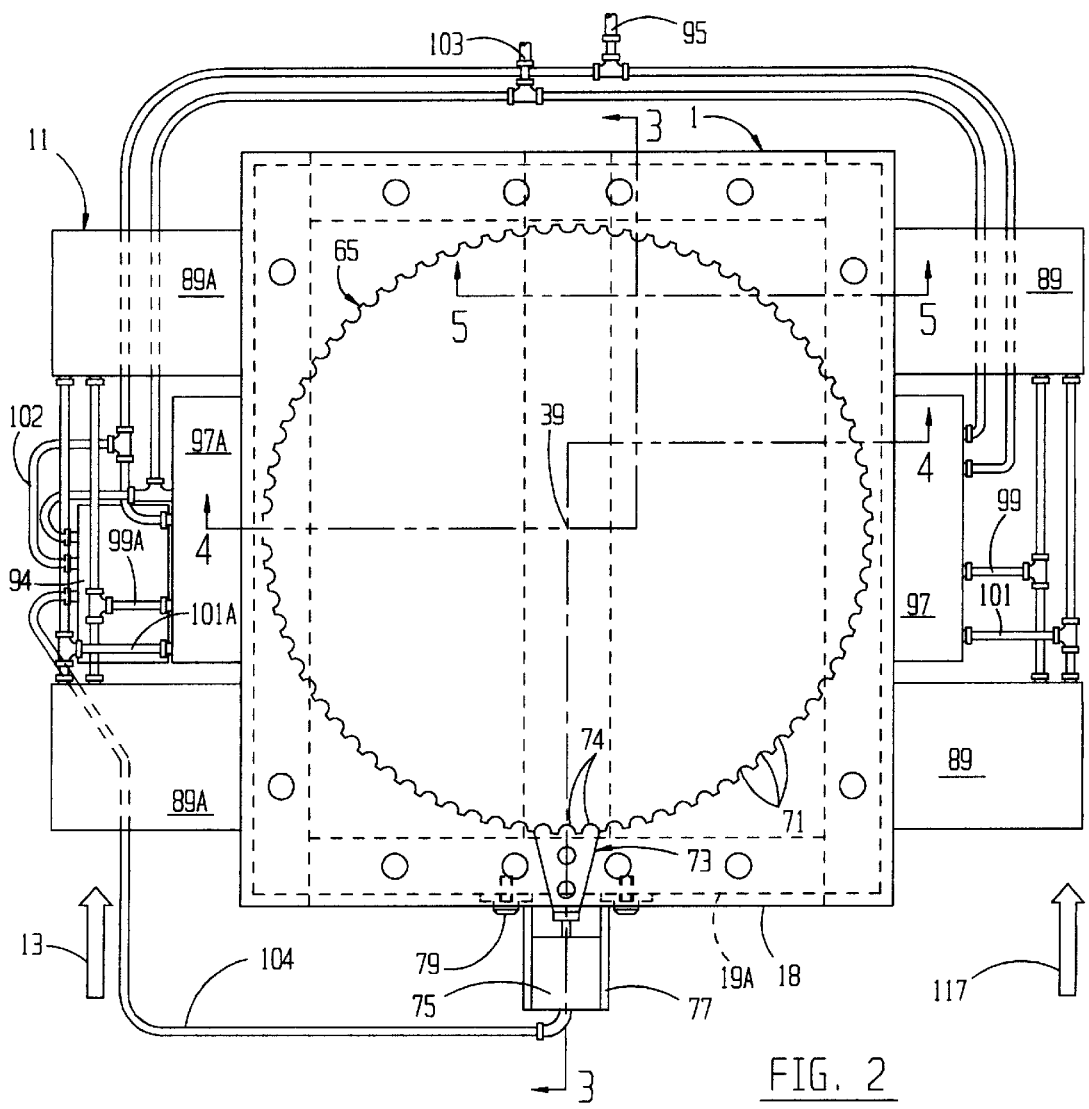

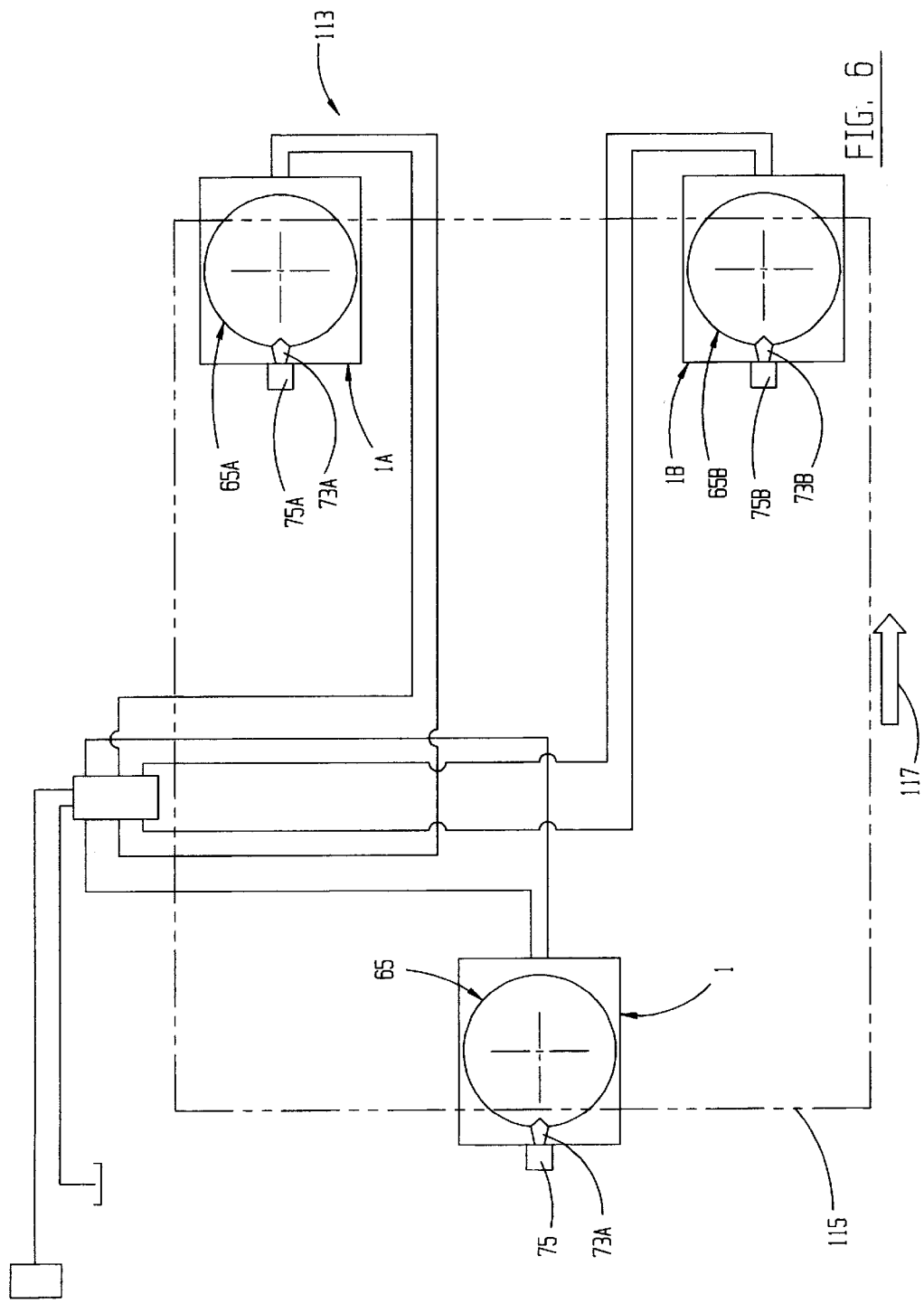

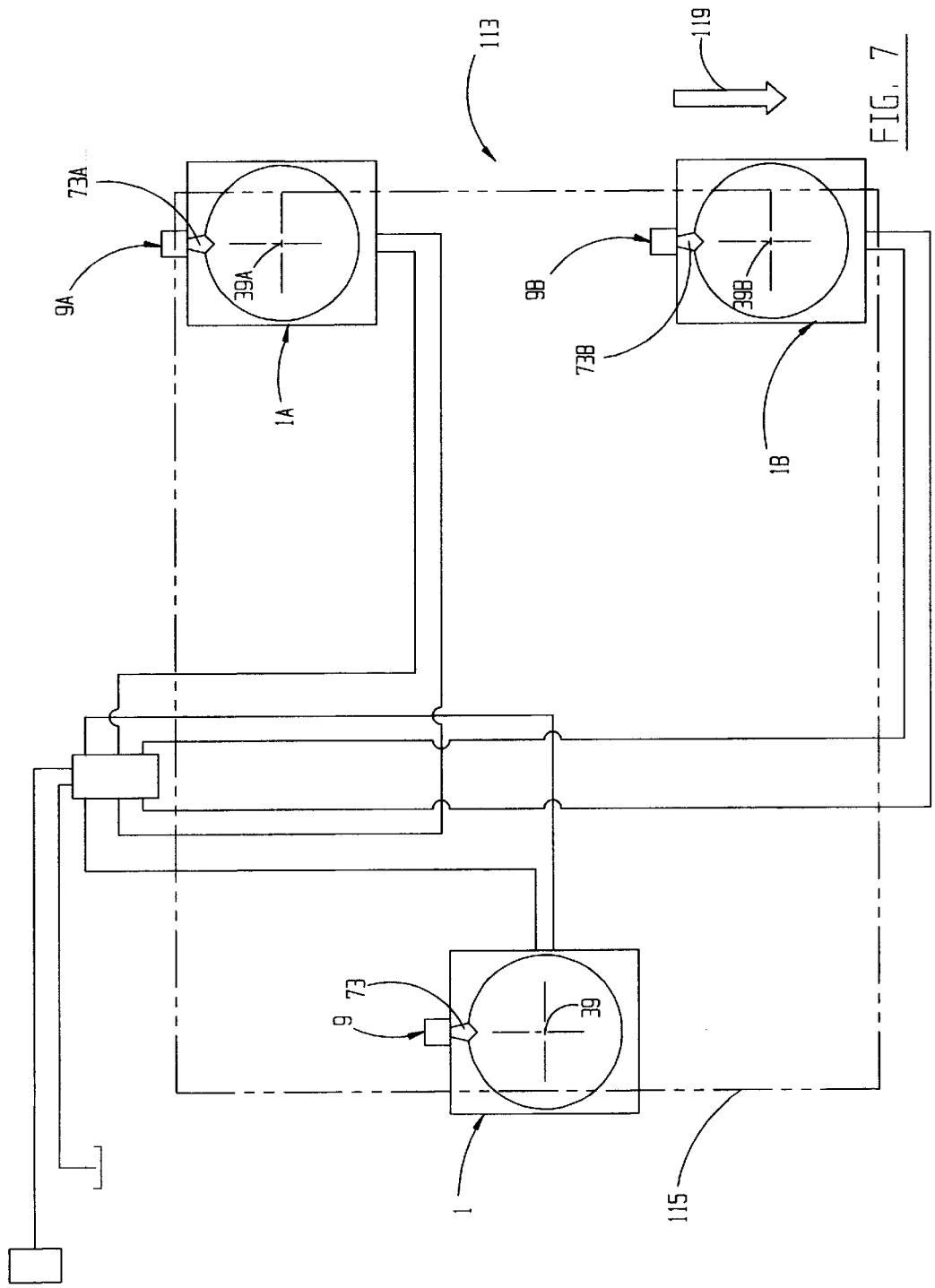

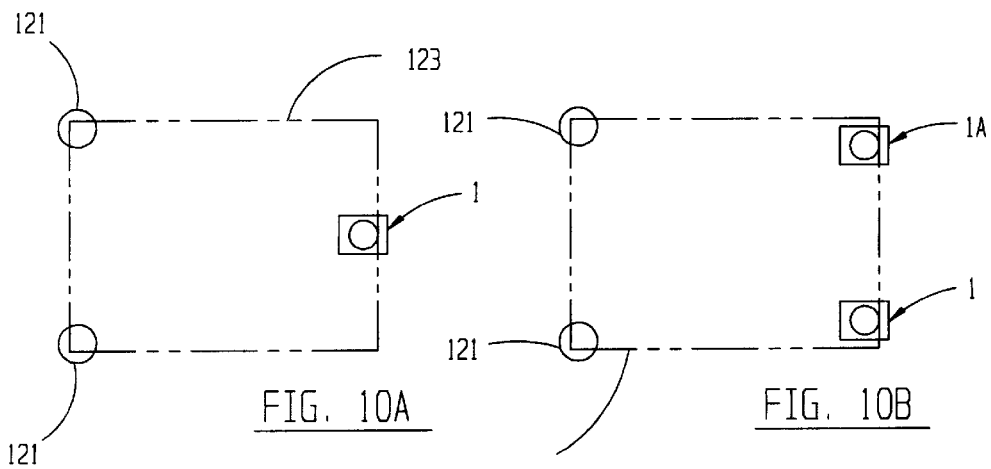
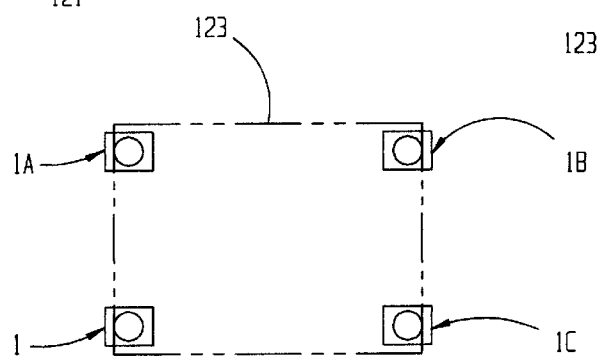
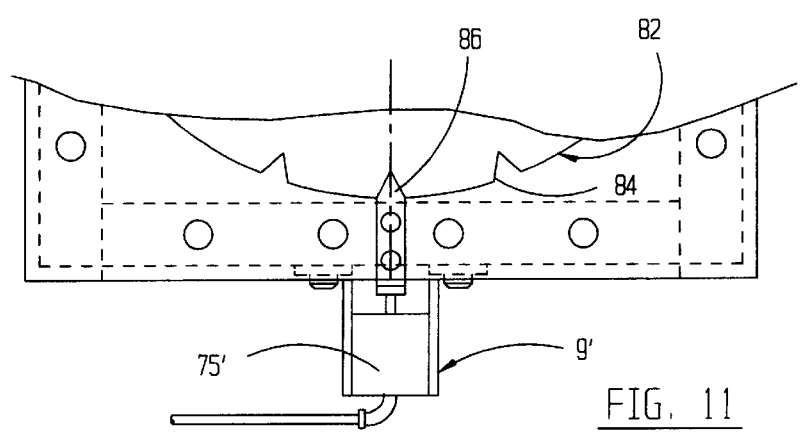

MODULAR CRAWLER SYSTEM

BACKGROUND OF THE INVENTION

This invention pertains to moving equipment, and more particularly to apparatus for transporting very heavy objects along horizontal surfaces.

DESCRIPTION OF THE PRIOR ART

Moving large machines, building components, and other heavy objects is a difficult and potentially dangerous task. The moving equipment must not only be capable of supporting great weights, it must also be very low to the ground such that the object need be lifted only a few inches. Ideally, the moving equipment should support the object no more than about six inches above the ground.

Prior equipment for moving heavy loads include skates manufactured by Hevi-Haul International, Ltd. of Butler, Wisconsin. The skates include a heavy frame in which are mounted one or more rollers. The skates are made in different models having capacities of from 1.5 tons to 100 tons. The object to be moved is placed on one or more skates. Handles connected to the skates are used to push or pull them along a floor or the like. It is common to use a conventional forklift truck to push or pull the skates. Similar roller-type skates are distributed by Hilman Rollers of Wall, New Jersey.

Although skates and other roller-type moving equipment have been in use for many years, they are not entirely satisfactory. One problem is that they are not capable of rolling over small obstructions in their paths. For example, even a pebble or a crack in a concrete floor can stop a roller of a heavily loaded skate from rotating. Accordingly, great care must be taken that the floor be smooth and clean.

Another drawback of prior skates is that they lack maneuverability. They are capable of rolling only in straight lines. To turn a load, the skates must be jerked by the handles to turn them in the desired direction. Alternately, the load must be lifted off the skates so the skates can be turned. Such procedures are very time consuming and awkward. Further, usually only relatively small angles can be turned at a time, which makes maneuvering an object into a small space or around sharp corners very inefficient.

It is known to transport heavy objects by means of crawler-type equipment. Typical examples may be seen in U.S. Pat. No. 3,269,475; 3,398,806; 3,804,275; 3,398,806; and 4,747,457; and in Soviet Union patent 260136. The crawler mechanisms of the foregoing patents are bulky and of very limited versatility. Accordingly, they are not suitable for and have not been adopted by the heavy equipment moving industry.

Thus, a need exists for improvements in equipment for moving heavy loads.

SUMMARY OF THE INVENTION

In accordance with the present invention, a modular crawler system is provided that is more versatile and maneuverable than prior moving equipment. This is accomplished by apparatus that includes compact but rugged crawlers that are independently controlled from a central station.

Each crawler is comprised of a heavy frame having a center bar and two side bars. The three bars are joined to a top plate. A first set of shafts is journaled between the center bar and one of the side bars. Another set of shafts is journaled between the center bar and the other side bar. Each set of shafts has two drive shafts and two or more support shafts. The two drive shafts of each set are connected each to a separate hydraulic motor. On each drive shaft of each set is a sprocket.

Trained around the sprockets of the drive shafts of the first and second sets of shafts are endless first and second tracks, respectively. Each track is composed of a number of elongated track pads that extend for substantially the full distance between the center bar and the associated side bar. Each track pad has a rectangular cross section. The track pads are connected by links located within transverse slots in inside surfaces of the track pads. Pins hold the links to the pads. The sprockets mesh with the links. Outside continuous surfaces of the track pads engage the floor or ground.

The track pads and sprocket shafts are designed such that the weight on the crawler is transferred through the support shafts to the slotted inside surfaces of the track pads. In addition, the sprocket shafts are also designed to transfer some of the weight to the track pads.

The pair of hydraulic motors for each set of shafts rotate in unison both in speed and direction. That is, a first pair of hydraulic motors drives the sprocket shafts of the first set of shafts together. Accordingly, the first track, associated with the first set of shafts, is driven simultaneously by both sprocket shafts of the first set of shafts. Similarly, the second track, associated with the second set of shafts, is driven simultaneously by both sprocket shafts of the second set of shafts.

The first pair of hydraulic motors is controlled independently of the second pair. If the two pairs of motors are controlled to operate at the same speed and in the same direction, both tracks are driven at the same speed and direction and thereby propel the crawler in a straight line. On the other hand, by changing the speed of one pair of motors relative to the other, the tracks are driven at different speeds and thereby propel the crawler around a turn.

Further in accordance with the present invention, a brake is incorporated into the crawler. The brake includes a carrier that is rotatable within the top plate about a vertical axis. The carrier supports the weight of the object being moved. A number of indentations are formed on the carrier periphery. A lock plate with protrusions that are complimentary to the carrier indentations is reciprocable on the carrier top plate. A plunger actuates the lock plate into and out of engagement with the carrier. When in the engaged position, the lock plate prevents rotation of the carrier on the top plate. When the lock is in the disengaged position, the carrier can rotate.

In use, as many crawlers as necessary can be used to move an object. The hydraulic motors of each crawler are operable independently of the other crawlers. The crawlers are placed under the object in the arrangement that best suits the object's weight, size, and shape. The crawlers are initially oriented to travel in the same desired direction. The lock plates are activated to engage the carrier. When the object is safely on the crawlers, they are operated to move in the desired direction. The tracks can propel the crawlers up and down inclines. The tracks can also ride over small obstacles without difficulty. Corners of any sharpness can be turned by controlling the hydraulic motors of one track of each crawler at a different speed than the other track. Gradual corners may be turned without disengaging the lock plate from the carrier. On the other hand, if a sharp corner must be turned, or to move the object into a final position, it is often convenient to turn the crawlers without turning the object. That is readily achieved by disengaging the lock plates from the carriers and controlling the hydraulic motors to turn the crawlers without imparting any rotational movement to the object. In fact, the object can be stopped and then moved in any direction relative to its initial direction of travel without changing the orientation of the object.

The method and apparatus of the invention, using two sets of sprocket and support shafts that are journaled oppositely from a center bar, thus move very heavy objects with high maneuverability. The crawler has a very low profile and is capable of moving the object in any desired direction relative to a preceding direction, even though the object is not lifted off the crawler during the change in crawler direction.

Other advantages, benefits, and features of the present invention will become apparent to those skilled in the art upon reading the detailed description of the invention.

BRIEF DESCRIPTION OF THE DRAWINGS

FIG. 2 is a top view of the crawler.

FIG. 5 is a cross sectional view taken along line 5—5 of FIG. 2.

FIG. 6 is a simplified schematic top view of a modular crawler system of the invention moving an object in a first direction.

FIG. 7 is a view similar to FIG. 6, but showing the modular crawler system moving the object in a second direction without changing the spatial orientation of the object.

FIGS. 10A–10C are schematic diagrams of alternate configurations of the modular crawler system.

FIG. 11 is a partial view generally similar to FIG. 2, but showing an alternate construction of the brake system according to the present invention.

DETAILED DESCRIPTION OF THE PREFERRED EMBODIMENT

Figure 1:
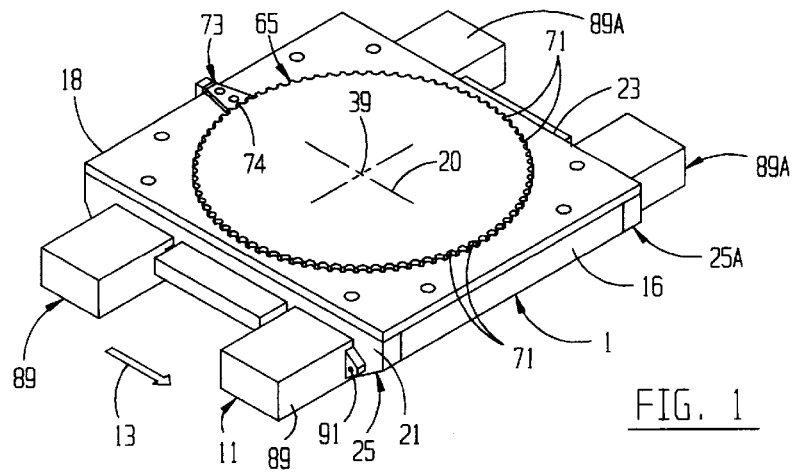
FIG. 1 is a perspective view of the crawler of the invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–5, a low profile crawler 1 is illustrated that includes the present invention. The crawler 1 is particularly useful for moving very heavy objects along generally horizontal surfaces 3 such as factory floors. However, it will be understood that the invention is not limited to operating in indoor environments.

The crawler 1 comprises a frame 5, two independent track systems 7 and 7A, and a brake system 9. The track systems 7 and 7A and the brake system 9 are powered by a hydraulic system 11. By appropriate operation of the hydraulic system 11, the carrier moves along the surface 3 in forward and reverse directions. Although arbitrary, the forward direction is indicated by arrow 13, and the reverse direction is indicated by arrow 15. Accordingly, the crawler is considered to have a front end 16, a back end 18, a right side 21, and a left side 23.

The frame 5 is composed of a heavy top plate 17. The top plate 17 defines a central vertical axis 39 and a vertical longitudinal plane 20 through the axis 39. That is, the plane 20 extends between the crawler front end 16 and back end 18.

A front bar 19 and a back bar 19A are joined to the top plate 17 along the front end 16 and back end 18, respectively, of the crawler 1. Identical side bars 25 and 25A are joined to the top plate along the crawler sides 21 and 23, respectively. A center bar 27 is joined to the top plate parallel to and midway between the side bars 25 and 25A. The center bar 27 is substantially symmetrical about the longitudinal plane 20. In the illustrated construction, the side bars are each of two-piece construction. A first piece 29 of each side bar is joined to the top plate by screws 31. A second piece 33 of each side bar is joined to the respective first piece 29 by screws 35. Similarly, the center bar 27 has a first piece 36, and a second piece 38 joined to the first piece by screws 40. The top plate has a bore 37 centered on a central vertical axis 39.

The track systems 7 and 7A are identical in all material respects. Each system includes a pair of drive shafts 41 at the front and back ends 16 and 18, respectively, of the carrier 1. The axial centerlines 44 of the two drive shafts 41 define a horizontal plane 42. Each drive shaft is journaled in the frame side and center bars by associated bearings 43. The diameter D of the drive shafts is closely controlled. Axially spaced sprockets 45 project radially from the diameter D. One end of the drive shaft is bored at reference numeral 47 and has a keyway 48.

Each track system 7 and 7A further includes a pair of support shafts 49 located between the drive shafts 41. Each support shaft 49 is journaled in an associated side bar 25, 25A and in the center bar 27 by appropriate bearings 51. The support shafts have the same diameter D as the drive shafts 41. The axial centerlines 46 of the support shafts lie in the plane 42.

Trained around the drive shafts 41 and support shafts 49 of each track system 7 and 7A is an endless track 53. The endless track 53 is made up of a number of elongated rectangular track pads 55 that extend substantially the full distance between the center bar 27 and the associated side bar 25, 25A. Each track pad 55 has an inside surface 56 and an outside surface 60. The inside surface 56 of each track pad has a number of transverse slots 57 that are aligned with the sprockets 45 of the drive shafts. Adjacent track pads are connected to each other by chain links 58 that are located within the slots 57. The links 58 are held in place by long pins 59 extending for the full lengths of the track pads and passing through the links. That design enables the tracks to turn about sprockets of relatively small diameter and also contributes to the low profile of the crawlers 1. The size and length of the links match the spaces 61 between the teeth of the drive shaft sprockets.

The track 53 of each track system 7 and 7A has a first run 64 that contacts the ground or floor 3 and a return run 66. It is an important aspect of the invention that the top plate 17 be spaced as closely as possible to the track return run 66. A distance X of approximately 0.25 inches is in keeping with the invention and enables the crawler 1 to have a very low profile. It is a further feature of the invention that the tracks are almost completely surrounded on the front and back ends 16 and 18, respectively, and the right and left sides 21 and 23, respectively, by the front and back bars 19 and 19A, respectively, and the side bars 25 and 25A.

When the tracks 53 are in place on the drive shafts 41 and support shafts 49, the diameters D of the support shafts contact the inside surfaces 56 of the track pads 55. Consequently, most of the weight of the crawler 1 is supported on the floor 3 by the support shafts acting through the track pads 55. The full length of the track pads between the center bar 27 and the associated side bar 25, 25A are in contact with the support shafts. Consequently, even very heavy weights on the crawler are distributed over relatively large areas of the track pads. The tracks 53 of the two track systems 7 and 7A are separated only by the center bar, thereby rendering the crawler very compact. Further, as mentioned, the top plate 17 is as close to the floor as possible consistent with sufficient load carrying capacity for the track systems.

The brake system 9 is comprised of a carrier 65 that preferably has a generally circular periphery. The carrier 65 has a center hub 67 that fits snugly within the bore 37 of the top plate 17. A thin washer 69, which preferably is made of a synthetic bearing material, is interposed between the top plate and the carrier. Around the periphery of the carrier are a number of indentations 71. In the particular construction illustrated, the indentations are in the form of generally semi-circular cutouts continuously around the carrier periphery. Other shapes for the indentations are also acceptable.

A lock plate 73 is selectively moveable between engagement and disengagement with the indentations 71 on the carrier 65. For that purpose, the lock plate 73 has semi-circular protrusions 74 that are complimentary to the carrier indentations. When the lock plate 73 is in engagement with the carrier, the carrier cannot rotate within the top plate bore 37. Disengagement of the lock plate from the carrier enables rotation of the carrier. To engage the lock plate with and disengage it from the carrier, a fluid cylinder 75 is mounted to the crawler 1. Mounting of the fluid cylinder 75 may be by two right angle brackets 77 fastened with screws 79 to the cross bar 19A at the crawler back side 18. An L-shaped bar 81 slides on the cross bar 19A and is guided in a slot 83 in the top plate 17. A plunger 85 of the fluid cylinder 75 mates with a hole 87 in the bar 81.

Turning to FIG. 11, an alternate construction for a lock plate 86 and carrier 82 of a brake system 9' is shown. In FIG. 11, the carrier 82 has V-shaped indentations 84 located at regular angular intervals around the carrier periphery. The angular intervals may vary; I contemplate 15 degrees or 22.5 degree intervals to be satisfactory. The lock plate 86 is shaped to fit within the indentations 84 when the lock plate is engaged, by means of the cylinder 75', with the carrier. In all other respects, the brake system 9' is identical to the brake system 9 described previously.

The hydraulic system 11 powers the track systems 7 and 7A independently of each other. For that purpose, the track system 7 has a first pair of hydraulic motors 89, and the track system 7A has a second pair of hydraulic motors 89A. A suitable hydraulic motor is a 2000 Series Disk Valve Hydraulic Motor Model No. 104-1028-2M manufactured by the Eaton Corporation of Eden Prairie, Minn. Each hydraulic motor 89, 89A is piloted in an associated side bar 25, 25A and attached thereto by fasteners 91. Each motor has a shaft 92 that enters the bore 47 of an associated drive shaft 41. A key 93 connects the motor shaft 92 to the drive shaft. Accordingly, rotation of the hydraulic motors rotates the drive shafts. In turn, rotation of the drive shafts drives the tracks 53 through the drive shaft sprockets 45 and the links 58. Particularly, rotation of the hydraulic motors 89 drives the track of the track system 7, and rotation of the motors 89A drives the track of the track system 7A. The two hydraulic motors 89 are controlled to rotate at the same speed and in the same direction, as will be explained shortly. The hydraulic motors 89A also rotate at the same speed and in the same direction with each other. The cylinder 75 is also operated by the hydraulic system 11 by means of a valve 94.

In FIG. 2, reference numeral 95 indicates a line connected to a source of hydraulic pressure. The pressure line 95 splits to serve two four-way valves 97 and 97A. Line 99 from a first outlet port of valve 97 connects to corresponding first ports of the two hydraulic motors 89. Line 101 from a second outlet port of the valve 97 connects to corresponding second ports of the motors 89. Similarly, line 99A from a first outlet port of the valve 97A connects to corresponding first ports of the motors 89A, and line 101A from a second outlet port of the valve 97A connects to corresponding second ports of the motors 89A. The pressure line 95 is also connected via line 102 to the cylinder valve 94. Line 103 is a return line from the valves 94, 97, and 97A. Line 104 connects the valve 94 with the cylinder 75.

Figure 8:
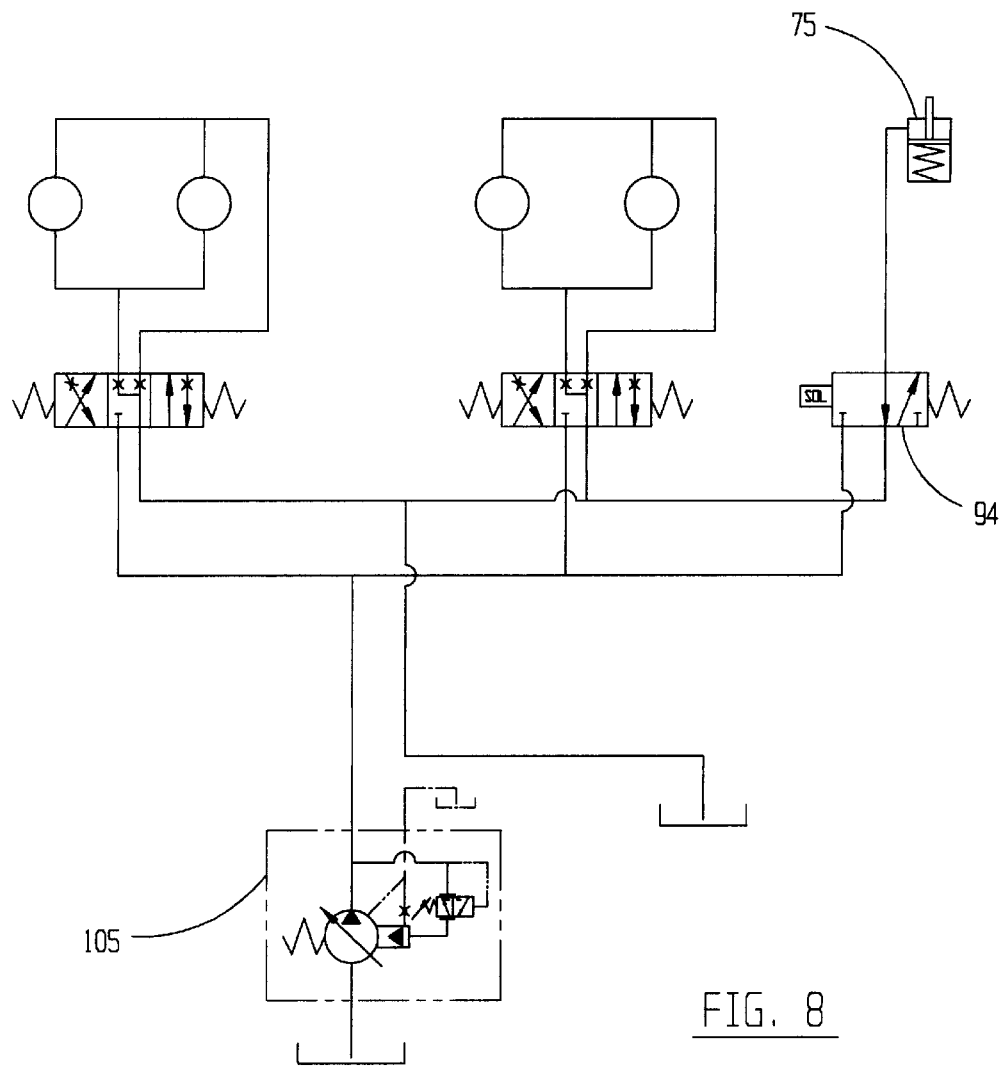
FIG. 8 is a schematic diagram of the hydraulic system for the crawler.

In the preferred embodiment, the valves 97 and 97A are proportional directional control valves, such as those marketed by Waterman Hydraulics of Niles, Ill. A hydraulic schematic diagram is shown in FIG. 8. Hydraulic pressure is supplied from a pump 105, which preferably includes a pressure compensator. Although not shown, I prefer that the pump 105 be part of a mobile cart or the like that is capable of traveling along the floor 3 with the crawler 1.

Figure 9:
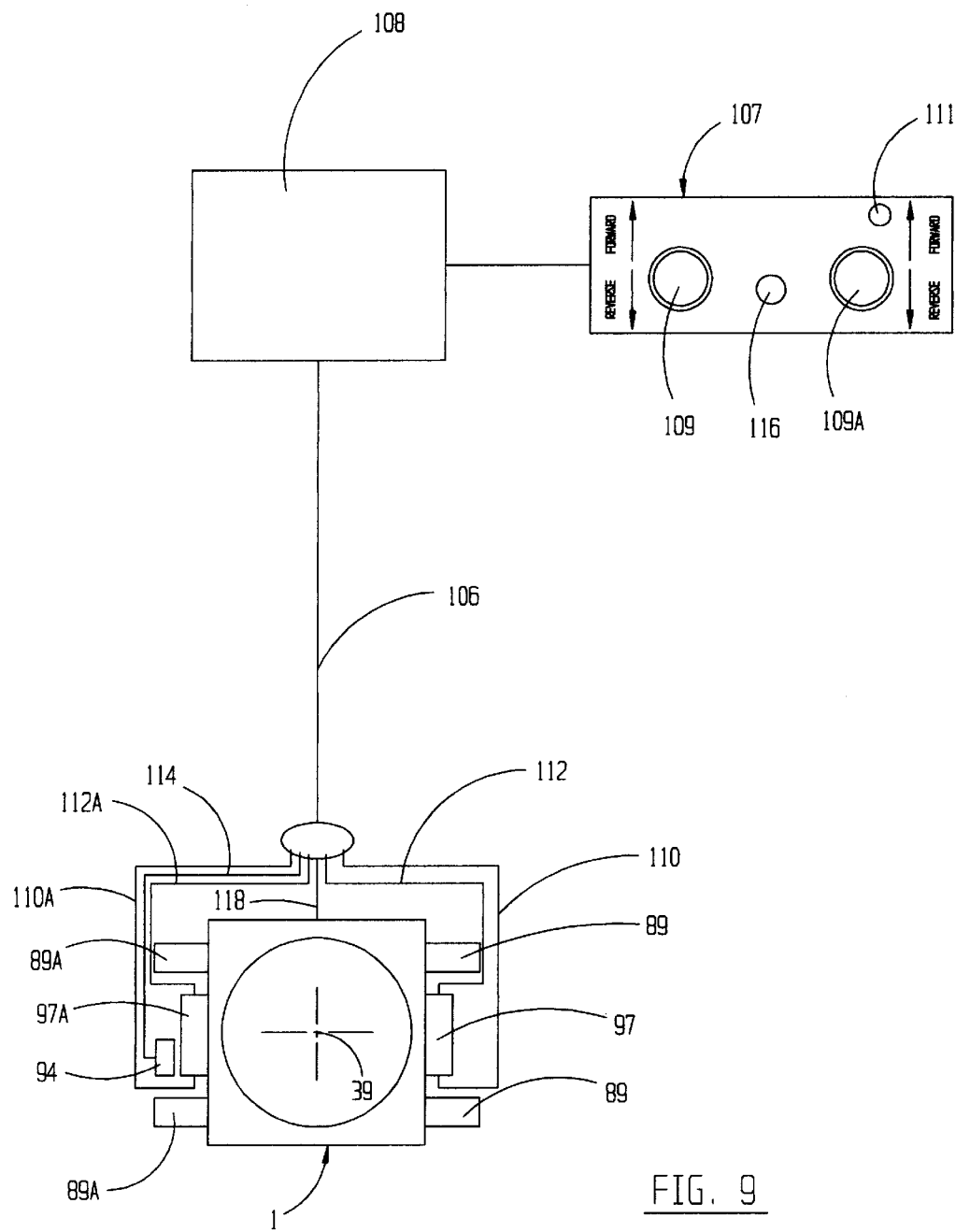
FIG. 9 is a simplified schematic diagram of the electrical circuit for the crawler of the invention.

The crawler 1 is operated from an electrical control box 107, FIG. 9. I have found that a joystick control works very well. A suitable joystick is a single axis Series WEHC manufactured by Waterman Hydraulics. Joysticks 109 and 109A in the control box 107 are wired through a microprocessor 108 and flexible cable 106 to the valves 97 and 97A in a manner that operates them independently of each other. A Model No. VC-003 010051B microprocessor board manufactured by Kar-Tech Industries of Oconomowoc, Wis. gives good results. The valve 97 is operated through wires 110 and 112 to rotate the motors 89 in forward and reverse directions, respectively, by corresponding actuation of the joystick 109. Similarly, the valve 97A is operated through wires 110A and 112A to rotate the motors 89A in forward and reverse directions, respectively, by corresponding actuation of the joystick 109A. In that manner, the valves 97 and 97A can be operated to rotate the respective pairs of hydraulic motors 89 and 89A in the same direction at the same speed, in the same direction at different speeds, or in the opposite direction at the same or different speeds. The track systems 7 and 7A will propel the crawler accordingly. For instance, the crawler can be rotated 360 degrees about the axis 39 by operating the track system 7 in the forward direction and the track system 7A in the reverse direction. A separate switch 111 operates the brake system valve 94 through a wire 114. Reference numeral 116 indicates a master on-off switch for the control box. Reference numeral 118 indicates a ground wire.

OPERATION

The crawler 1 can be used alone if the object to be moved has a small enough volume to balance safely on the crawler.

The low profile of the crawler greatly facilitates placement of the object on it. Further, the low profile of the crawler contributes to the stability of the object being moved. The joysticks 109, 109A are manually actuated to operate the crawler to travel in the desired direction. By properly actuating the joysticks, the hydraulic motors 89 and 89A drive the respective track systems 7 and 7A to propel the crawler in a straight line or around turns.

Figure 12:
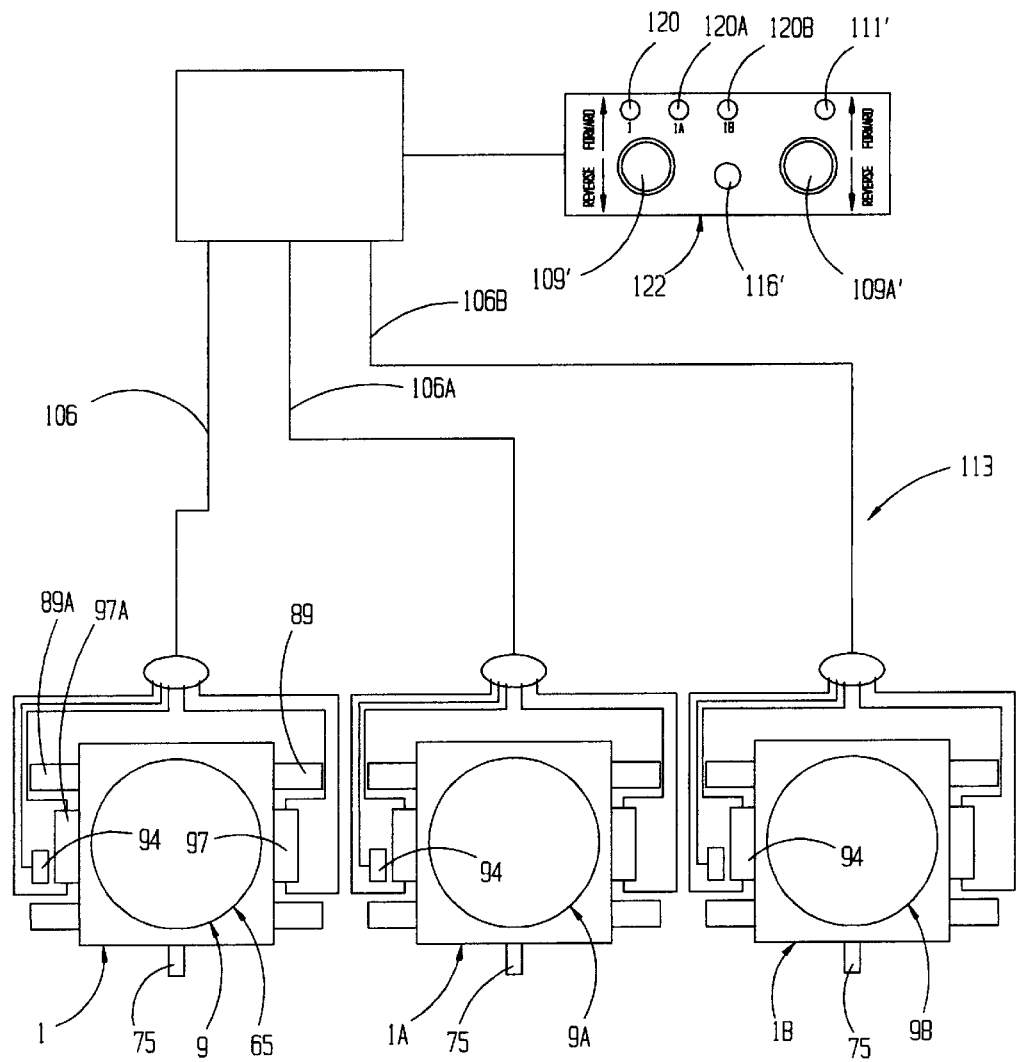
FIG. 12 is a view similar to FIG. 9, but showing a simplified electrical schematic for controlling a modular crawler system having multiple crawlers.

For most applications, multiple crawlers 1 are used as part of a modular crawler system 113, FIGS. 6 and 12. The particular modular crawler system 113 has three crawlers 1, 1A, and 1B that are used to move a heavy object indicated by reference numeral 115. The electrical control box 122 has two joysticks 109' and 109A' that correspond to the respective track systems 7 and 7A of the crawlers. The control box 122 has three switches 120, 120A, and 120B that turn the respective crawlers 1, 1A, and 1B on and off individually. Master switch 116' turns the control box on and off. Switch 111' controls all the brake systems 9, 9A, and 9B of the respective crawlers at the same time. It will be appreciated, of course, that the modular crawler system can have two or more crawlers, depending on the size and shape of the object 115 to be moved.

Figure 3:
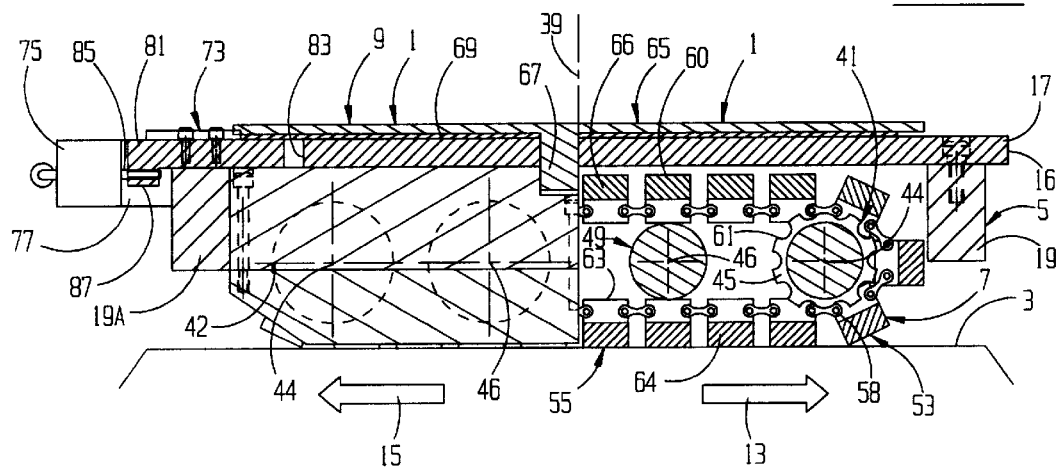
FIG. 3 is a cross sectional view taken along line 3—3 of FIG. 2 and rotated 90 degrees clockwise.
Figure 4:
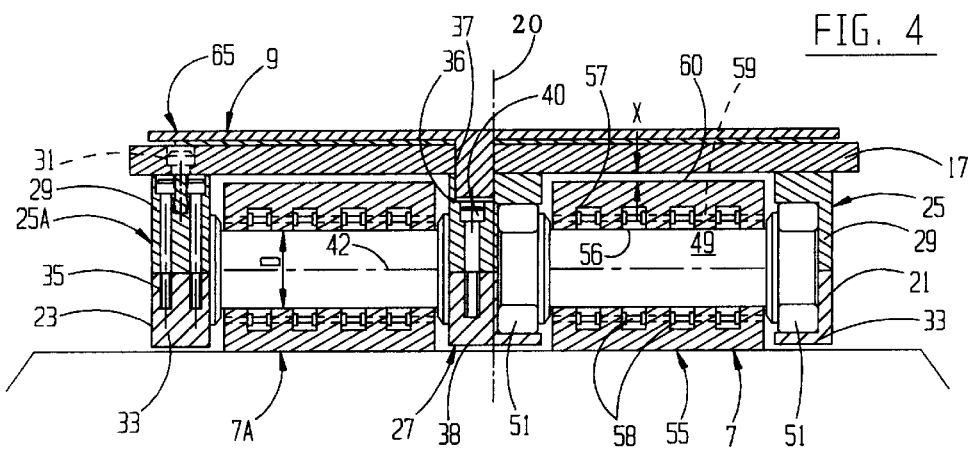
FIG. 4 is a cross sectional view taken along line 4—4 of FIG. 2.

The crawlers 1, 1A, and 1B are oriented in the same direction. It will be assumed that the initial direction of travel is in the direction of arrow 117, which is the same as the crawler forward direction 13 (FIG. 3). Master switch 116' is set to energize the control box 122. Switch 111' is set to energize the valves 94 and thus to extend the respective cylinders 75 on the crawlers. Accordingly, the lock plates 73 engage the indentations 71 of the respective carriers 65. The object 115 is then placed on the crawler carriers.

To move the object 115 in the direction of arrow 117, both joysticks 109' and 109A' are actuated in the same direction and in the same amount. As a result, the valves 97 and 97A of each crawler 1, 1A, and 1B control the associated hydraulic motors 89 and 89A of the respective crawlers to rotate in the same direction and at the same speed. The crawler brake systems 9 prevent the carriers 65 from rotating relative to the rest of the crawler. Consequently, the crawlers are all constrained to travel together in the same direction by the weight of the object on them. The flexible cables 106, 106A, and 106B enable the control box 122 to act as a portable central control station for the modular control system 113 at a distance from the crawlers and the object. The operator is thus able to walk with safety around the crawlers and object with the control box in his hands to watch for possible problems and timely take corrective action.

The versatility of the invention is illustrated in FIG. 7. In FIG. 7, it will be assumed that the modular crawler system 113 of FIG. 6 has moved the object 115 for a desired distance in the direction of arrow 117, and that it is next desired to move the object at a right angle in the direction of arrow 119. To achieve that result, the brake systems 9 of the crawlers are controlled by the switch 111' in the control box 122 to disengage the lock plates 73 from the associated carrier indentations 71. Then the joystick 109' is actuated to cause only the hydraulic motors 89A to rotate. As a result, the crawlers turn about their respective axes 39 in clockwise directions with respect to FIG. 6 until they attain the orientation of FIG. 7. Turning the crawlers does not impart any substantial motion to the object 115. That is because the carriers, which are in contact with the object, rotate relative to the crawlers within the respective bores 37 in the crawler top plates 117. As a result, the crawlers can be turned to travel in the new direction of arrow 119 without changing the orientation of the object. After the crawlers are all turned in the new direction, the brake systems 9, 9A, and 9B are set by the switch 111' such that the lock plates 73 again engage the respective carrier indentations 73. In that manner, the object can be moved at a sharp right angle to a prior direction of movement.

It will be appreciated, of course, that the crawlers 1, 1A, and 1B can rotate under the object 115 at different sharp angles than 90 degrees. The number of sharp angles that the crawler can turn under the object is limited only by the number of indentations 71 of the carriers 65. That is, the crawlers can rotate relative to the object in correspondence with the spacing of the carrier indentations. For example, if the carrier has 60 equally spaced indentations, the crawler can rotate in six degree increments under the object. Further, it is not necessary that all the crawlers turn at the same time or in the same amount. In FIG. 7 it was assumed that all three crawlers rotated 90 degrees by actuating all switches 120, 120A, and 120B in the control box 122. However, by selectively actuating the switches 120, 120A, or 120B, it is possible to rotate only selective crawlers without rotating the others.

The versatility of the invention is further illustrated in FIGS. 10A–10C. In FIG. 10A, the object 123 to be moved is relatively lightweight. It is supported on conventional dollies, rollers, or wheels represented by reference numerals 121. One crawler 1 is used to move and steer the object 123. In FIG. 10B, two crawlers 1 and 1A are used in connection with two conventional dollies 121 to move the object 123. In FIG. 10C, four crawlers 1, 1A, 1B, and 1C are used to move an exceptionally heavy or awkward object 123.

Although not shown, it will be realized by those skilled in the art that an object to be moved need not be placed directly on the crawlers 1. Rather, especially to suit objects having awkward shapes, such as tall building wall panels, the object can be supported on a framework that in turn is placed on the crawlers. The function of the modular crawler system 113 is the same whether the object itself is placed on the crawlers or whether an object-supporting framework is placed on the crawlers.

An example of a crawler 1 that works very well is as follows. The top plate 17 is approximately 22 inches long and 19 inches wide. The track pads 55 are 1.3 inches square and six inches long. The diameter D of the sprocket and drive shafts 41 and 49, respectively, is approximately 1.80 inches. The links 58 are number 40 chain links. The top surface of the carrier 65 is 6.38 inches above the ground 3. When powered by the hydraulic pump and motors 89, 89A described previously, the crawlers can move weights up to approximately 100,000 pounds each at an infinitely variable speed from zero to approximately 60 feet per minute.

In summary, the problems associated with moving very heavy objects can now be greatly reduced. The modular crawler system 113 provides high capacity and maneuverability with a very low profile. This desirable result comes from using the combined functions of the crawler 1. The track systems 7 and 7A are symmetrical about and closely spaced from a center bar 27 of the crawler. The track systems are independently controlled via the hydraulic system 11 to propel the crawler in either a straight line, or gradually around a turn, or in a sharp corner. The hydraulic system has separate and independent components that are operated from a portable central control station to control the track systems. The brake system 9 enables the crawler to travel in straight lines when the lock plate 73 is engaged with the carrier 65. The brake system further enables the crawler to change direction without changing the orientation of the object being moved relative to its original orientation. The very low profile of the crawler is achieved by locating the top plate 17 as close to the ground as possible consistent with adequate load carrying capacity of the track systems.

In addition to the superior performance of the invention, its construction is of a simple design and with rugged components. Accordingly, the modular crawler system 113 gives long service life with minimal maintenance. Further, any additional costs for the modular crawler system compared with prior moving equipment is more then compensated by the greatly increased productivity it brings to the moving industry.

Thus, it is apparent that there has been provided, in accordance with the invention, a modular crawler system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A compact crawler having a very low profile comprising:
   a. a frame defining a central vertical axis and a vertical longitudinal plane passing through the vertical axis, and comprising first and second side bars and a center bar therebetween, the center bar being substantially symmetrical about the frame longitudinal plane;
   b. first track means journaled in the first side bar and the center bar for propelling the crawler along a horizontal surface;
   c. second track means journaled in the second side bar and the center bar for cooperating with the first track means to propel the crawler along the horizontal surface, wherein
      the frame further comprises a top plate that completely overlies the first and second track means;
      the first and second track means have respective first runs that engage the horizontal surface and respective return runs parallel to the first run; and
      the top plate is spaced from the return runs of the first and second track means by approximately 0.25 inches to thereby aid the crawler to have a very low profile above the horizontal surface;
   d. means for driving the first and second track means independently of each other; and
   e. means for enabling the frame to rotate with respect to the heavy object comprising
      carrier means rotatable within the top plate for supporting the object, wherein:
         the carrier means comprises:
            i. a carrier rotatable on the top plate about the frame central vertical axis, the carrier having a periphery that defines a plurality of indentations; and
            ii. a washer interposed between the carrier and the top plate; and
      lock means for selectively engaging the carrier means to present rotation thereof in the top plate and disengaging from the carrier means to enable rotation thereof in the top plate, wherein:
         the lock means comprises:
            i. a lock plate slidable within the top plate and having at least one protrusion that is complimentary to the indentations in the carrier periphery; and
            ii. actuator means for selectively sliding the lock plate protrusion into an out of engagement with the carrier indentations,
      so that the crawler can move a heavy object along the horizontal surface, and so that the frame can rotate under the object when the lock plate is disengaged from the carrier means.

2. A compact crawler having a very low profile comprising:
   a. a frame defining a central vertical axis and a vertical longitudinal plane passing through the vertical axis, and comprising first and second side bars and a center bar therebetween, the center bar being substantially symmetrical about the frame longitudinal plane:
   b. first track means journaled in the first side bar and the center bar for propelling the crawler along a horizontal surface, wherein the track means comprises:
      i. a pair of first sprocket shafts journaled in the first side bar and the center bar, the first sprocket shafts having respective axial centerlines that define a first horizontal plane;
      ii. a first endless track trained over the first sprocket shafts, the first endless track comprising a plurality of first track pads having respective inside and outside surfaces and lengths that extend for substantially the full distance between the first side bar and the center bar; and
      iii. at least two first support shafts journaled in the first side bar and the center bar between the first sprocket shafts, the support shafts having respective axial centerlines that lie in the first horizontal plane;
   c. second track means journaled in the second side bar and the center bar for cooperating with the first track means to propel the crawler along the horizontal surface, wherein the second track means comprises:
      i. a pair of second sprocket shafts journaled in the second side bar and the center bar, the second sprocket shafts having respective axial centerlines that lie in the first horizontal plane;
      ii. a second endless track trained over the second sprocket shafts, the second endless track comprising a plurality of second track pads having respective inside and outside surfaces and lengths that extend for substantially the full distance between the second side bar and the center bar; and
      iii. at least two second support shafts journaled in the second side bar and the center bar between the second sprocket shafts, the support shafts having respective axial centerlines that lie in the first horizontal plane; and
   d. means for driving the first and second track means independently of each other,
      so that the crawler can move a heavy object along the horizontal surface.

3. The crawler of claim 2 wherein:
   a. each track pad has at least one transverse slot in the inside surface thereof; and
   b. the first and second tracks are each comprised of a plurality of links, there being at least one link pivotally connecting respective adjacent track pads to each other, the links being located within the transverse slots of the track pads to thereby aid the crawler to have a low profile.

4. The crawler of claim 3 wherein the first and second support shafts are in support contact with the inside surfaces of the first and second track pads along substantially the full lengths of the first and second track pads between the first side bar and the center bar, and between the second side bar and the center bar, respectively.

5. A compact crawler having a low profile comprising:
 a. a frame defining a central vertical axis and a vertical longitudinal plane passing through the vertical axis, and comprising first and second side bars and a center bar therebetween, the center bar being substantially symmetrical about the frame longitudinal plane;
 b. first track means journaled in the first side bar and the center bar for propelling the crawler along a horizontal surface;
 c. second track means journaled in the second side bar and the center bar for cooperating with the first track means to propel the crawler along the horizontal surface, wherein:
   i. the frame further comprises a substantially horizontal top plate that completely overlies the first and second track means and that is joined to the first and second side bars and the to the center bar;
   ii. the first and second track means have respective first runs that engage the horizontal surface and respective return runs parallel to the first run; and
   iii. the top plate is spaced from the return runs of the first and second track means by approximately 0.25 inches to thereby aid the crawler to have a very low profile above the horizontal surface; and
 d. means for driving the first and second track means independently of each other,
 so that the crawler can move a heavy object along the horizontal surface.

6. The crawler of claim 5 further comprising:
 a. carrier means rotatable within the top plate for supporting the object; and
 b. lock means for selectively engaging the carrier means to prevent rotation thereof in the top plate and disengaging from the carrier means to enable rotation thereof in the top plate,
 so that the frame can rotate under the carrier means and the object when the lock plate is disengaged from the carrier means.

7. A compact crawler having a very low profile comprising:
 a. a frame defining a central vertical axis and a vertical longitudinal plane passing through the vertical axis, and comprising first and second side bars and a center bar therebetween, the center bar being substantially symmetrical about the frame longitudinal plane;
 b. first track means journaled in the first side bar and the center bar for propelling the crawler along a horizontal surface;
 c. second track means journaled in the second side bar and the center bar for cooperating with the first track means to propel the crawler along the horizontal surface, wherein the frame further comprises a top plate that completely overlies the first and second track means, wherein
   the first and second side bars and the center bar are joined to the top plate; and
   front and back end bars are joined to the top plate and cooperate with the first and second side bars to generally surround the first and second track means on four sides; and wherein
   the first and second track means have respective first runs that engage the horizontal surface and respective return runs parallel to the first run; and
   the top plate is spaced from the return runs of the first and second track means by approximately 0.25 inches to thereby aid the crawler to have a very low profile above the horizontal surface; and
 d. means for driving the first and second track means independently of each other,
 so that the crawler can move a heavy object along the horizontal surface.

8. Apparatus for supporting a heavy object a short distance above and moving the object along a generally horizontal surface comprising:
 a. a frame comprising:
   i. a top plate located approximately six inches above the horizontal surface;
   ii. an elongated center bar joined to the top plate; and
   iii. first and second elongated side bars joined to the top plate parallel to and symmetrical about the center bar;
 b. first and second track means journaled between the first side bar and the center bar and between the second side bar and the center bar, respectively, for propelling the frame along the horizontal surface, wherein the first and second track means each comprise:
   a pair of drive shafts journaled between the associated side bar and the center bar;
   at least two support shafts journaled between the associated side bar and the center bar, the drive shafts and the support shafts having respective longitudinal centerlines that are coplanar;
   an endless track trained over the drive and support shafts;
   and motor means for rotating the pair of drive shafts in unison with each other, and
   wherein the frame further comprises front and back bars joined to the top plate and cooperating with the first and second side bars to substantially surround the endless tracks of the first and second track means on four sides; and
 c. carrier means rotatable supported on the frame top plates for supporting the object to be moved.

9. Apparatus for supporting a heavy object a short distance above and moving the object along a generally horizontal surface comprising:
 a. a frame comprising:
   i. a top plate located approximately six inches above the horizontal surface;
   ii. an elongated center bar joined to the top plate; and
   iii. first and second elongated side bars joined to the top plate parallel to and symmetrical about the center bar;
 b. first and second track means journaled between the first side bar and the center bar and between the second side bar and the center bar, respectively, for propelling the frame alone the horizontal surface, wherein the first and second track means each comprise:
   i. a pair of drive shafts journaled between the associated side bar and the center bar;
   ii. at least two support shafts journaled between the associated side bar and the center bar, the drive shafts and the support shafts having respective longitudinal centerlines that are coplanar;
   iii. an endless track trained over the drive and support shafts; and
   iv. motor means for rotating the pair of drive shafts in unison with each other; and
 c. carrier means rotatable supported on the frame top plate for supporting the object to be moved.

10. The apparatus of claim 9 wherein:
a. the endless tracks of the first and second track means each comprise:
   i. a plurality of track pads having respective opposite ends and inside and outside surfaces, the respective inside surfaces having at least one transverse slot therein; and
   ii. link means within the slots in the track pad inside surfaces for pivotally connecting respective adjacent track pads to each other; and
b. each drive shaft has at least one sprocket thereon that meshes with the link means for driving the endless tracks in response to rotation of the motor means.

11. The apparatus of claim 10 wherein the support shafts are contactable with the full lengths of the inside surfaces of the track pads between the respective opposite ends of the track pads.

12. The apparatus of claim 9 wherein the motor means comprises:
a. a first pair of motors connected to the pair of drive shafts of the first track means, and a second pair of motors connected to the drive shafts of the second track means; and
b. control means for controlling the first pair of motors to rotate independently of the second pair of motors,
   so that the motor means can selectively drive the endless tracks of the first and second track means at different speeds and in opposite directions to thereby turn and maneuver the object in different directions along the horizontal surface.

13. Apparatus for supporting a heavy object a short distance above and moving the object along a generally horizontal surface comprising:

a. a frame comprising:
   i. a top plate located approximately six inches above the horizontal surface;
   ii. an elongated center bar joined to the top plate; and
   iii. first and second elongated side bars joined to the top plate parallel to and symmetrical about the center bar;
b. first and second track means journaled between the first side bar and the center bar and between the second side bar and the center bar, respectively, for propelling the frame along the horizontal surface; and
c. carrier means rotatably supported on the frame top plate for supporting the object to be moved, wherein the carrier means comprises:
   i. a carrier having a hub that is rotatable within a bore in the frame top plate, wherein the carrier has a periphery in which are formed a plurality of indentations; and
   ii. lock means selectively engageable with and disengageable from the carrier for preventing and enabling, respectively, rotation of the carrier within the frame top plate, wherein the lock means comprises:
      a lock plate having protrusions thereon that are complimentary with the indentations on the carrier periphery; and
      means for selectively reciprocating the lock plate protrusions into and out of engagement with the carrier indentations, the carrier being rotatable on the frame top plate when the lock plate protrusions are disengaged from the carrier indentations.

\* \* \* \* \*